United States Patent

Sagane

[11] Patent Number: 5,454,100
[45] Date of Patent: Sep. 26, 1995

[54] ELECTRONIC APPARATUS

[75] Inventor: Tomonari Sagane, Kanagawa, Japan

[73] Assignee: Sony Corporation, Japan

[21] Appl. No.: 399,165

[22] Filed: Mar. 2, 1995

Related U.S. Application Data

[63] Continuation of Ser. No. 119,347, Sep. 9, 1993, abandoned.

[30] Foreign Application Priority Data

Sep. 18, 1992 [JP] Japan ................................ 4-275197

[51] Int. Cl.[6] .................................................. G06F 11/00
[52] U.S. Cl. .................... 395/182.06; 371/8.1; 364/245.3; 364/DIG. 1; 395/185.06; 395/420
[58] Field of Search ........................ 371/7, 8.1, 21.1, 371/21.2, 24, 48, 51.1, 67.1; 395/575, 425, 400, 725; 364/245, 245.3

[56] References Cited

U.S. PATENT DOCUMENTS

| | | | |
|---|---|---|---|
| 4,028,678 | 6/1977 | Moran . | |
| 4,028,679 | 6/1977 | Divine . | |
| 4,028,683 | 6/1977 | Divine et al. . | |
| 4,028,684 | 6/1977 | Divine et al. . | |
| 4,051,460 | 9/1977 | Yamada et al. | 364/900 |
| 4,095,278 | 6/1978 | Kihara | 364/900 |
| 4,150,428 | 4/1979 | Inrig et al. | 364/200 |
| 4,218,757 | 8/1980 | Drogichen | 364/900 |
| 4,291,375 | 9/1981 | Wolf | 364/483 |
| 4,319,343 | 3/1982 | Powell | 365/189 |
| 4,424,574 | 1/1984 | Enoki et al. | 364/900 |
| 4,456,966 | 6/1984 | Bringol et al. | 364/900 |
| 4,490,783 | 12/1984 | McDonaugh et al. | 364/200 |
| 4,490,812 | 12/1984 | Guterman | 364/900 |
| 4,542,453 | 9/1985 | Patrick et al. | 364/200 |
| 4,571,677 | 2/1986 | Hirayama et al. | 364/200 |

(List continued on next page.)

FOREIGN PATENT DOCUMENTS

| | | | |
|---|---|---|---|
| 0263447A2 | 4/1988 | European Pat. Off. | G06F/9/30 |
| 0428005A2 | 5/1991 | European Pat. Off. | G06F/9/26 |
| 0458559A2 | 11/1991 | European Pat. Off. | G06F/11/00 |
| 57-211651 | 12/1982 | Japan | G06F/11/28 |
| 58-016350 | 1/1983 | Japan | G06F/9/22 |
| 62-249231 | 10/1987 | Japan | G06G/9/22 |
| 1065633 | 3/1989 | Japan | G06G/9/22 |
| 1099129 | 4/1989 | Japan | G06F/9/22 |
| 1114941 | 5/1989 | Japan | G06G/9/22 |
| 1286029 | 11/1989 | Japan | G06F/9/06 |

OTHER PUBLICATIONS

Charlie Melear, "Applications for Microcomputers with $E^2$PROM," Electro/86 and Mini/Micro Northeast 11 (1986), Conference Record, Los Angeles, Calif., USA, pp. 1/9.

IBM Technical Disclosure Bulletin, vol. 26, No. 10B, Mar. 1984, New York, USA, pp. 5606/5607, L. Weiss, "Path Microcode Change Level Check".

IBM Technical Disclosure Bulletin, vol. 30, No. 5, Oct. 1987, "On–Site ROS Patch Mechanism".

IBM Technical Disclosure Bulletin, vol. 31, No. 1, Jun. 1988, "Dual Indirect RAM/ROM Jump Tables for Firmware Updates".

*Primary Examiner*—Robert W. Beausoliel, Jr.
*Assistant Examiner*—Albert Decady
*Attorney, Agent, or Firm*—Limbach & Limbach; Philip M. Shaw, Jr.

[57] ABSTRACT

An electronic apparatus for allowing firmware contained therein to be corrected externally at a mass production stage. Correction data with which to correct an internal ROM content are held in an external storage. The correction data are placed by a program residing in the ROM into a register and a RAM. A comparator compares an execution address on the address bus with a correction address in the register. In case of a match between the two addresses, the CPU is interrupted to execute the correction content placed in the RAM, the correction content taking the place of the data portion to be corrected in the ROM. If an update command is entered from the outside to update the content of the external storage, the storing of the correction data into the register and the RAM is inhibited.

11 Claims, 4 Drawing Sheets

U.S. PATENT DOCUMENTS

| | | | |
|---|---|---|---|
| 4,610,000 | 9/1986 | Lee | 364/200 |
| 4,620,273 | 10/1986 | Mitani et al. | 364/136 |
| 4,727,476 | 2/1988 | Bouchon | 364/200 |
| 4,745,542 | 5/1988 | Wilburn | 364/900 |
| 4,751,703 | 6/1988 | Picon et al. | 371/10 |
| 4,802,119 | 1/1989 | Hoene et al. | 364/900 |
| 4,819,154 | 4/1989 | Stiffler et al. | 364/400 |
| 4,831,517 | 5/1989 | Grouse et al. | 364/200 |
| 4,905,200 | 2/1990 | Pidsosny et al. | 364/300 |
| 5,051,897 | 9/1991 | Yamaguchi et al. | 364/200 |
| 5,063,499 | 11/1991 | Garber | 395/500 |
| 5,199,032 | 3/1993 | Sparks et al. | 371/60 |
| 5,214,771 | 5/1993 | Clara et al. | 395/500 |
| 5,305,460 | 4/1994 | Kaneko et al. | 364/200 |

ELECTRONIC APPARATUS

This is a continuation of application Ser. No. 08/119,347 filed on Sep. 9, 1993, now abandoned.

BACKGROUND OF THE INVENTION

1. Field of the Invention

The present invention relates to an electronic apparatus such as a customized microcontroller and, more particularly, to an electronic apparatus integrating into a single chip such devices as a central processing unit (CPU), a read-only memory (ROM) having programs and data stored fixedly therein and a random access memory (RAM).

2. Description of the Related Art

Heretofore, camera-incorporating video tape recorders (known as camcorders) and like electronic equipment comprise a microcontroller for controlling all or part of their functions, the microcontroller being a one-chip customized LSI electronic device. This type of microcontroller is a customized microcomputer generally composed of a CPU, memories such as ROM and RAM, and peripheral circuits including I/O ports.

The CPU in the microcomputer acts as an address controller for controlling access to the memories or as a processor for executing programs. Stored fixedly in the ROM as firmware is the information by which to control the electronic equipment that incorporates the microcomputer. The RAM offers the CPU a working area and other facilities for program execution. The peripheral circuits deal with communication with the outside. The ROM's, when furnished illustratively as mask ROM's, can significantly reduce the cost of the electronic equipment in which these memories are incorporated.

Over the years, more and more firmware has been stored in the ROM's of electronic devices so as to enhance their performance as well as to make them functionally distinct from their competitors on the market. Utmost care is used to ensure that improved program structures and various checkups keep bugs out of the firmware after its incorporation in mass-produced microcontrollers. Should a bug be detected in mass-produced microcontrollers, the adverse effects thereof need to be corrected by adding an external circuit to the existing devices or by replacing outright the defective devices with bug-free, mass-produced microcontrollers. Such corrections take time, money and human resources. If electronic devices of high packaging density such as camcorders are found to have a bug, it is virtually impossible to correct the bug by adding an external circuit thereto because there is little spare room.

SUMMARY OF THE INVENTION

It is therefore an object of the present invention to overcome the above and other deficiencies and disadvantages of the related art and to provide an electronic apparatus having an architecture designed beforehand to address bugs at the mass-production stage, the architecture circumventing a detected bug when given correction data from the outside, the correction data being updated if found to contain an error.

In carrying out the invention and according to one aspect thereof, there is provided an electronic apparatus integrating, into a single body, fixed storage means for storing read-only data, processing means for performing processing based on the data stored in the fixed storage means and input/output means for outputting and inputting data to and from an outside source. The electronic apparatus comprises correction address storage means for storing a correction address of the data stored in the fixed storage means, correction content storage means for storing a correction content of the data stored in the fixed storage means, comparing means for comparing an execution address of the processing means with the correction address and for outputting a coincidence signal if the two addresses are found to coincide with each other, access switching means for switching, when the comparing means outputs the coincidence signal, access by the processing means from the fixed storage means to the correction content storage means, and control means. The control means is for selectively enabling the storing of data to the correction address storage means and the correction content storage means, selectively enabling the switching access by the access switching means, and causing the correction address and the correction content to be retrieved from an external storage means and placed into the correction address storage means and the correction content storage means, respectively. The control means prevents the correction address and the correction content from being retrieved from the external storage means and written to the correction address storage means and the correction content storage means when the control means receives a command signal from an external input means.

In a preferred structure according to the invention, the electronic apparatus further comprises external input means and communicating means. The communicating means communicates with the external input means which allows commands to be input to the electronic apparatus for writing and updating the correction address and the correction content. The control means enables or disables, based on the status of the communicating means, the storing of data to the correction address storage means or to the correction content storage means, as well as enables or disables the switching of the object of access by the access switching means.

In another preferred structure according to the invention, the electronic apparatus further comprises external operation means external thereto and inhibiting means that is internal to the access switching means thereof. The external operation means is operated to activate the inhibiting means to inhibit the switching of the object of access by the processing means.

In a further preferred structure according to the invention, the electronic apparatus further comprises external operation means. The external operation means is operated to prevent the coincidence signal output of the comparing means from entering the access switching means.

In operation, if a bug is detected in the fixed storage means of electronic equipment at the mass production stage, that bug is circumvented by simply inputting a correction address and a correction content of the storage through the use of the invention. To prevent the storing of an erroneously corrected content into the correction content storage means, which would trigger a program runaway preventing control from getting passed on to a correction content updating program, the control means of the invention restores the state in which to run that program.

These and other objects, features and advantages of the invention will become more apparent upon a reading of the following description and appended drawings.

DESCRIPTION OF THE PREFERRED EMBODIMENTS

The preferred embodiments of the invention will be described below with reference to the accompanying drawings.

First Embodiment

Figure 1:
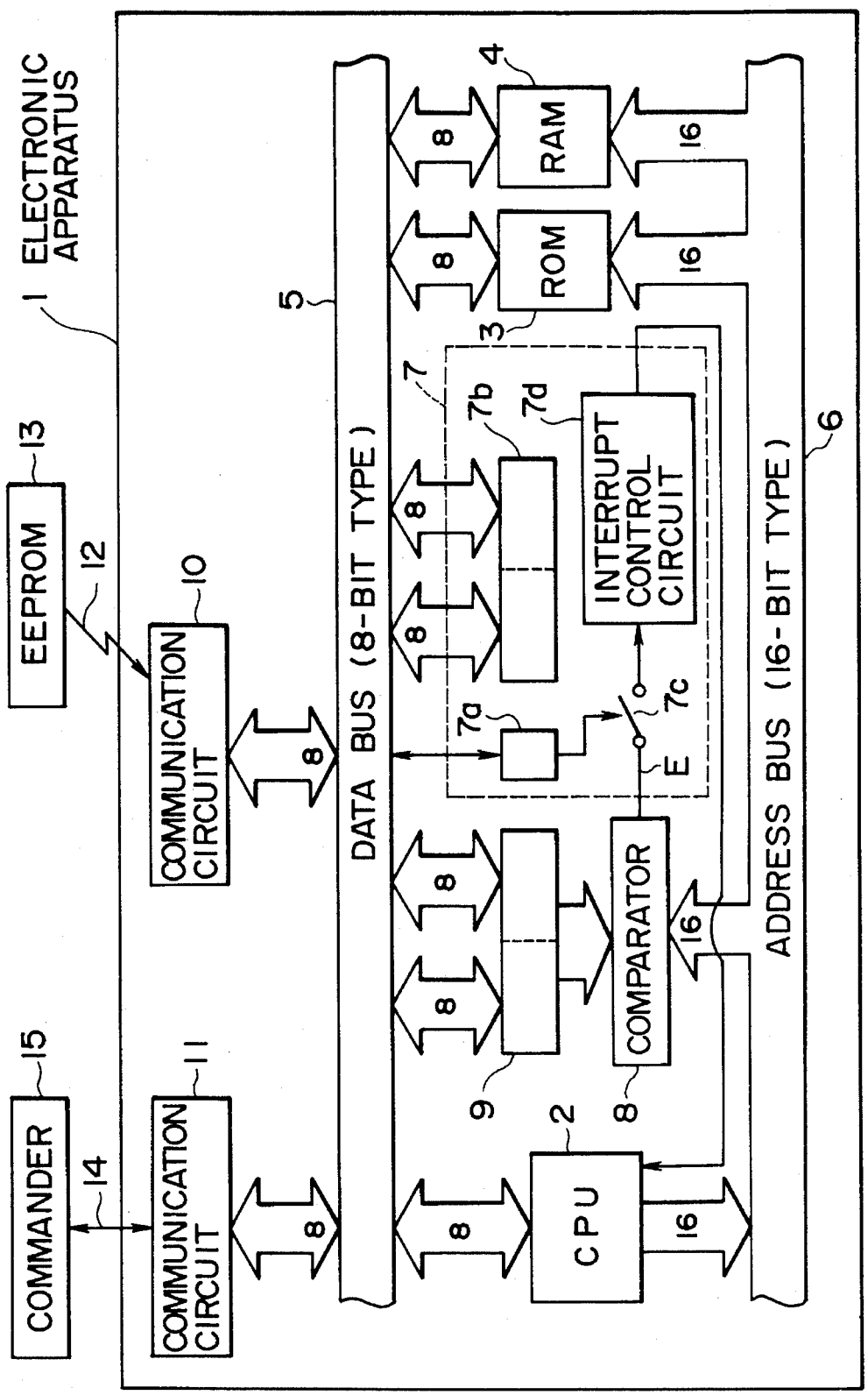
FIG. 1 is a block diagram of an electronic apparatus practiced as a first embodiment of the invention.

How the first embodiment is constituted will now be described with reference to FIG. 1 which is a block diagram of the electronic apparatus practiced as the first embodiment. In FIG. 1, the electronic apparatus 1 comprises a CPU 2, a ROM 3, a RAM 4, a data bus 5, an address bus 6, an access switching unit 7, a comparator 8, an interrupt generating address register 9, and communication circuits 10 and 11. The communication circuit 10 is connected to an EEPROM 13 via a communication line 12; the communication circuit 11 is connected to a commander 15 via a communication line 14.

The EEPROM 13 is external storage means that stores a correction address, i.e., the address or the start address of the data portion to be corrected; a correction content, i.e., the content to be patched onto a desired data portion; and the address of a location in the ROM 3 to which control is returned after patching. The correction address and the correction content will be collectively referred to as correction data hereunder.

The correction address held in the EEPROM 13 is written to the 16-bit interrupt generating address register 9 via the communication line 12 and communication circuit 10 as well as via the 8-bit data bus 5. Likewise, the correction content stored in the EEPROM 13 is written to the RAM 4. The write operations are carried out by an IPL (initial program loader) that resides in the ROM 3.

The 16-bit comparator 8 monitors the execution address on the address bus 6 and, if the execution address coincides with the correction address, outputs a coincidence signal E. The comparator 8 may be implemented either by hardware or by software.

A control flag latch 7a constituting part of the access switching unit 7 is a latch indicating the presence or absence of a data portion to be corrected in the ROM 3. The control flag latch 7a is set to "1" upon input of correction data and to "0" if no such input is made. A switch 7c is opened when the control flag latch 7a is set to "0" and is closed when the latch 7a is set to "1." This causes the coincidence signal E to enter an interrupt control circuit 7d as an interrupt request signal. The interrupt handling effected by the interrupt control circuit 7d transfers control to the address given by an interrupt vector register 7b. The start address of the correction content stored in the RAM 4 is latched in the interrupt vector register 7b at the time of correction data writing.

The correction content in the RAM 4 is suffixed illustratively with a jump instruction for a jump to an address skipping the data portion to be corrected in the ROM 3. The instruction returns control from the RAM 4 to the ROM 3. It should be noted that the return of control from the interrupt handling is effected not by a return instruction but by the jump instruction in order to skip the data portion to be corrected in the RAM 4. The skip illustratively involves discarding data saved in stacks.

The commander 15 is operation means by which to write or update correction data. The commander comprises various operation keys and a display unit. When a write or update command is input through the commander 15, that command is input to the CPU 2 via the communication line 14 and communication circuit 11 as well as via the 8-bit data bus 5.

Upon receipt of the command from the commander 15, the CPU 2 inhibits two kinds of write operations: the writing of the correction address from the EEPROM 13 to the interrupt generating address register 9, and the writing of the start address of the correction content in the RAM 4 to the interrupt vector register 7b. The CPU 2 then sets the control flag latch 7a to "0." These operations are carried out for the following reasons:

If the correction data stored in the EEPROM 13 contain a bug, the starting of patching can be followed by a program runaway that makes it impossible to return address control to the ROM 3. In such a case, correct processing is supposed to be performed by updating the correction data in the EEPROM 13. Whereas the writing or updating of the correction data is to be effected by use of the IPL in the ROM 3 of the electronic apparatus 1, the above program runaway keeps control from being passed on to the IPL. This makes it impossible to update the correction data. By contrast, the above operations skip the patching process, allowing the IPL to carry out its control task.

Figure 2:
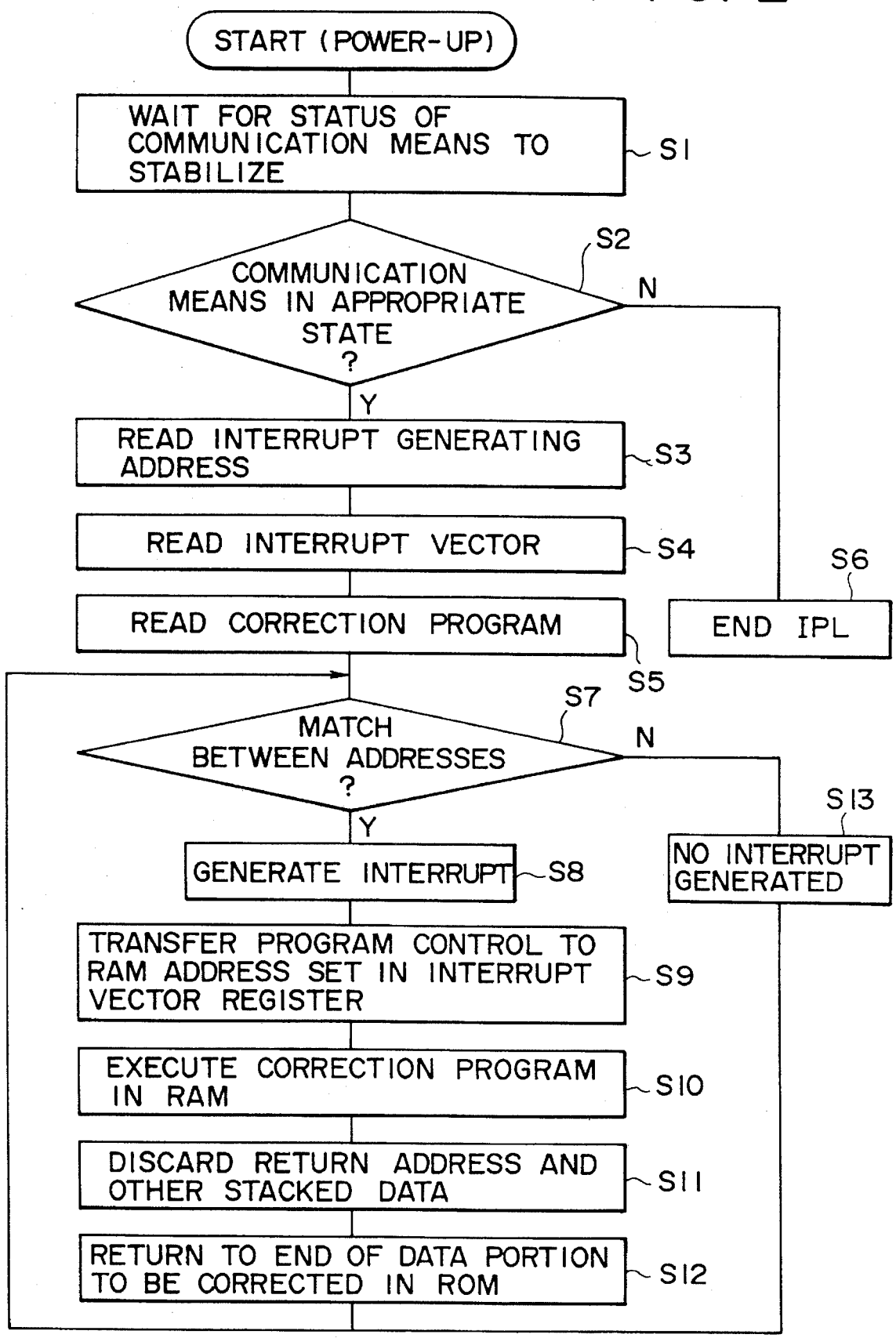
FIG. 2 is a flowchart of steps in which the first embodiment works.

FIG. 2 is a flowchart of steps in which the first embodiment works. How the first embodiment works will now be described with reference to FIGS. 1 and 2. Upon initialization following power-up, the IPL in the ROM 3 waits for operation status to stabilize between the commander 15 on the one hand and the communication line 14 and communication circuit 11 on the other (step S1 of FIG. 2). Whether or not the status is stable is detected either by counting time on a timer, or by exchanging signals between the commander 15 and the communication circuit 11.

A check is then made to see if the communication line 14 is in an appropriate state (step S2). That the communication line 14 is in the appropriate state means, illustratively, the absence of a write or update command entered from the commander 15 for writing or updating the correction data, or the disconnection of the commander 15 from the electronic apparatus 1.

If the communication line 14 is not in the appropriate state, the processing by the IPL comes to an end (step S6). Although not shown in the figure, if a write or update command is found at this step S2 to be input from the commander 15, control is transferred to a patch data correction program in the ROM 3. If the commander 15 is found at step S2 to be disconnected from the electronic apparatus 1, control is passed on illustratively to a program for controlling the object of control (e.g., servo system of camcorder) in the electronic equipment incorporating the electronic apparatus 1.

If the communication line 14 is found at step S2 to be in the appropriate state, the IPL latches, into the interrupt generating address register 9 the correction address from among the correction data stored in the EEPROM 13 (step S3). The IPL then latches the start address of the correction content to the interrupt vector register 7b (step S4). The IPL further writes the correction content to an appropriate address in the RAM 4 and sets the control flag latch 7a to "1" (step S5). This completes the processing by the IPL.

The 16-bit comparator 8 compares the execution address placed onto the address bus 6 with the correction address latched in the interrupt generating address register 9 (step S7). In case of a mismatch between the two addresses, no interrupt is generated and the ROM 3 is accessed (step S13). If the two addresses coincide with each other, the comparator 8 supplies the interrupt control circuit 7d with a coincidence signal E via the switch 7c, thereby generating an interrupt (step S8). With the interrupt generated, control is passed on to the address latched in the interrupt vector register 7b, i.e., the start address of the correction content in the RAM 4 (step S9). This causes the correction content (program) stored in the RAM 4 to be executed (step S10).

Because return of control from the interrupt is effected by a jump instruction, the correction content is ended with an instruction that is executed in step S11) to discard the return address and other data saved in stacks. Lastly, the jump instruction at the end of the correction program is executed. This causes control to be returned to an address that skips the data portion to be corrected in the ROM 3 (step S12). The comparator 8 continues to compare the addresses in preparation for another access to the data portion to be corrected (step S7).

As a modification of the first embodiment, external switches may be operated to reset the control flag latch 7a and to latch a dummy address in the interrupt generating address register 9. Another modification is to provide a gate circuit or switching circuit for allowing the outputs of the control flag latch 7a, comparator 8 and interrupt control circuit 7d to be turned on and off externally. This setup, if implemented, eliminates steps 1, 2 and 6 in FIG. 2.

A further modification is to write to the RAM 4, before step S1 of FIG. 2, the correction data stored in the EEPROM 13. In this setup, with the communication line 14 found to be in the appropriate state in step S2, the correction address written in the RAM 4 is latched into the interrupt generating address register 9, and the start address of the data portion to be corrected is latched into the interrupt vector register 7b.

There may be further modifications. If the ROM 3 includes a plurality of bugs to be corrected, step S10 of FIG. 2 may be followed for each bug by a step of updating the interrupt generating address register 9 and the interrupt vector register 7b to reflect the next correction address and the start address of the next correction content, respectively.

The switch 7c in FIG. 1 may be removed and the control flag latch 7a may be used instead to turn on and off the comparator 8. Furthermore, the control flag latch 7a and the switch 7c may be removed and, if the ROM 3 contains no data portion to be corrected, a dummy address may be latched into the interrupt generating address register 9. In FIG. 1, the EEPROM 13 may be furnished inside the electronic apparatus 1 and an EEPROM writer may be connected to the communication line 12. With the correction data written in the EEPROM 13, the data may be allowed to reside in a changeable manner inside the electronic apparatus 1.

Second Embodiment

Figure 3:
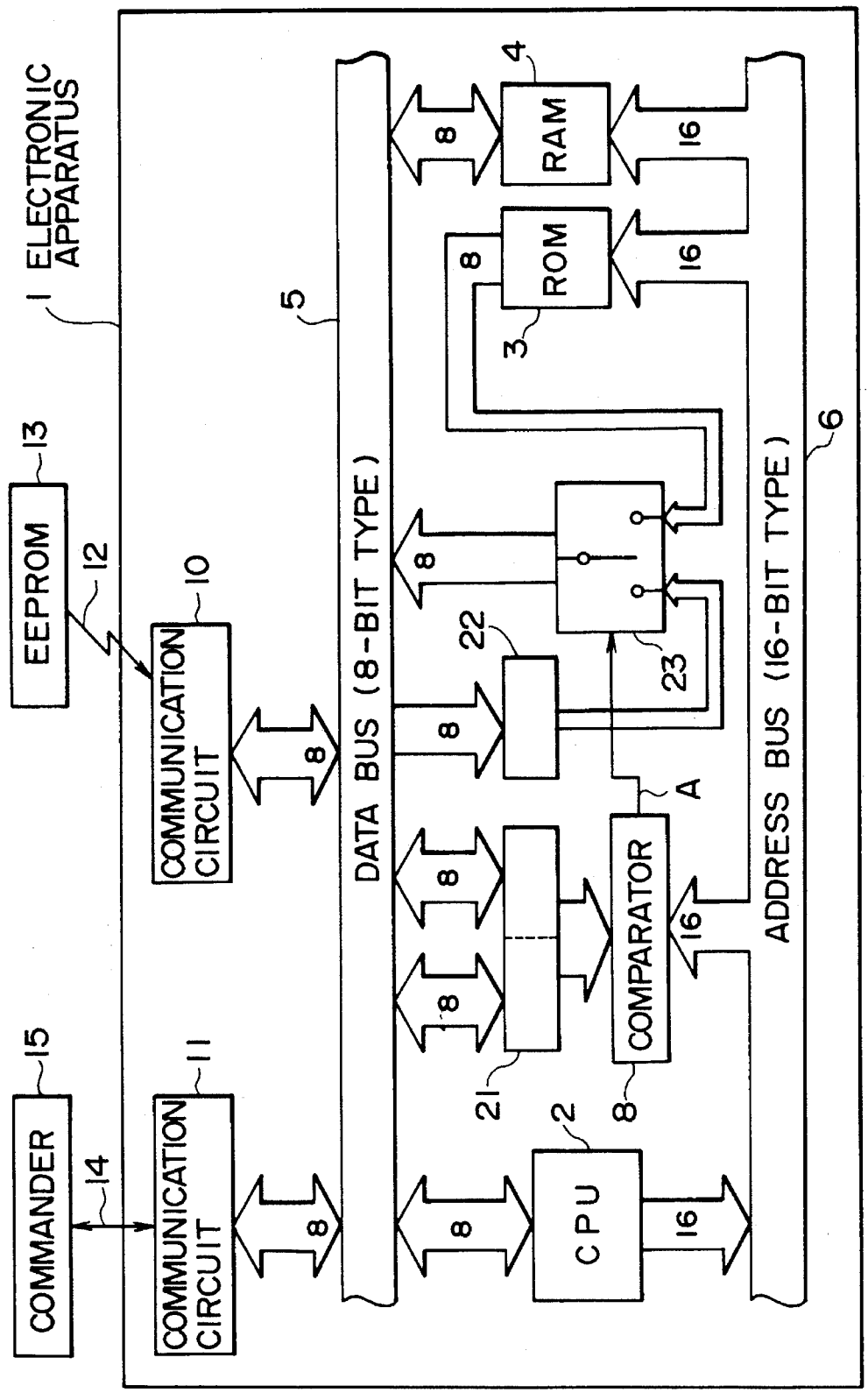
FIG. 3 is a block diagram of an electronic apparatus practiced as a second embodiment of the invention.

FIG. 3 is a block diagram of the second embodiment of the invention. In FIGS. 3 and 1, like reference characters designate like or corresponding parts, and repetitive descriptions of the parts in FIG. 3 are omitted.

A correction address register 21 temporarily accommodates a correction address, i.e., a one-word address to be corrected in the ROM 3. A correction data register 22 stores temporarily one-word data to be corrected. A switch 23 is used to select either the output of data from the ROM 3 onto the data bus 3, or the output of correction data from the correction data register 22.

Figure 4:
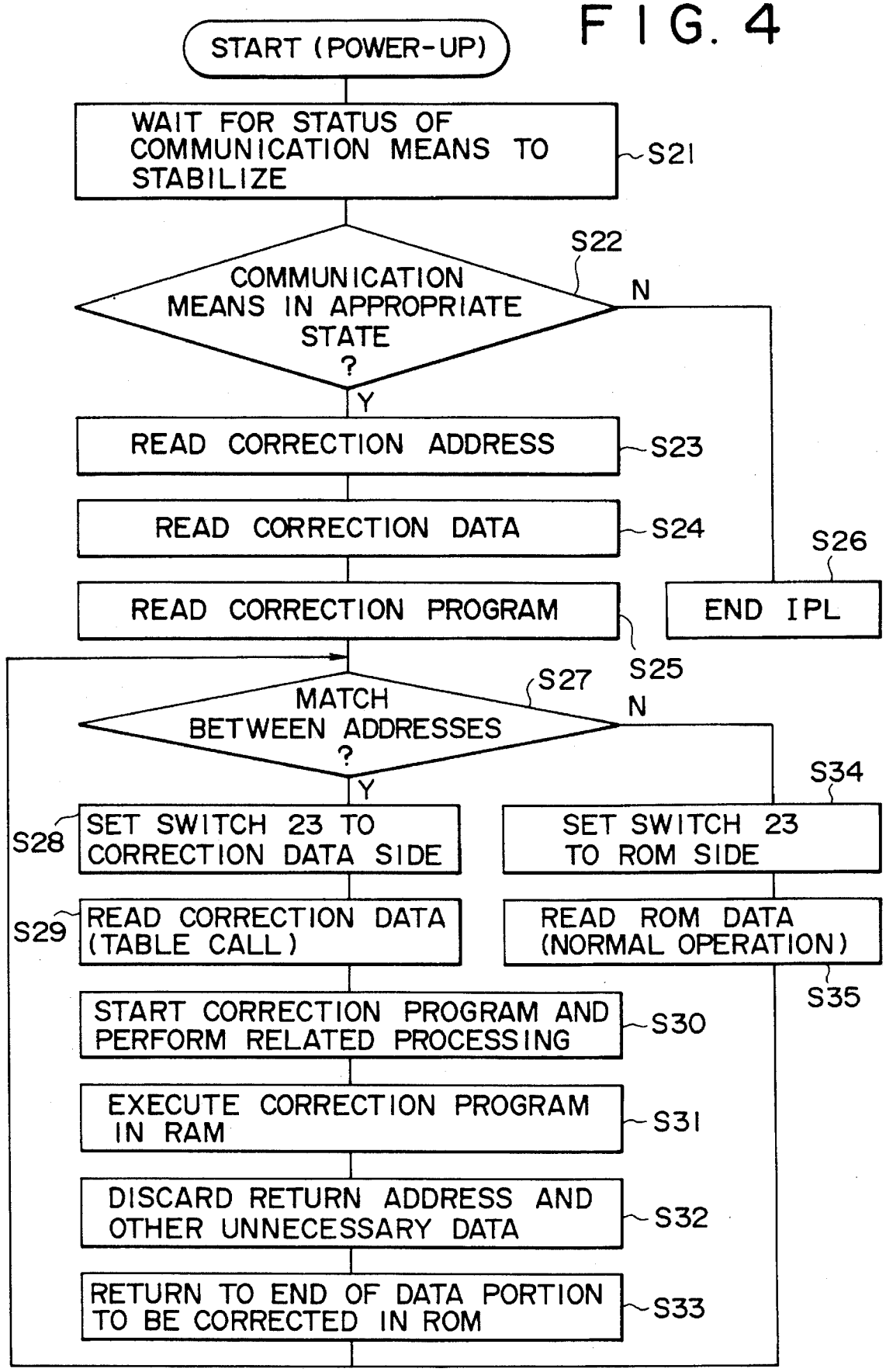
FIG. 4 is a flowchart of steps in which the second embodiment works.

FIG. 4 is a flowchart depicting how the second embodiment of the invention works. How the second embodiment works will now be described with reference to FIGS. 3 and 4. Upon initialization following power-up, the IPL in the ROM 3 waits for operation status to stabilize between the commander 15 on the one hand and the communication line 14 and communication circuit 11 on the other (step S21 of FIG. 4). A check is then made to see if the communication line 14 is in an appropriate state (step S22). If the communication line 14 is not in the appropriate state, the processing by the IPL comes to an end (step S26). The subsequent steps are the same as those of the first embodiment in FIG. 2.

If the communication line 14 is found to be in the appropriate state, the IPL latches into the correction address register 21 the correction address from among the correction data stored in the EEPROM 13 (step S23). The IPL then latches the correction data into the correction data register 22 (step S24). The IPL further writes the correction content to the RAM 4 (step S25). This completes the processing by the IPL. Next, the comparator 8 compares the execution address placed onto the address bus 6 with the correction address placed in the correction address register 21 (step S27). In case of a mismatch between the two addresses, the switch 23 is set to the ROM 3 position (step S34). As a result of access to the ROM 3 by the CPU 2, the data held in the ROM 3 are output therefrom onto the data bus 5 (step S35).

If the execution address and the correction address coincide with each other, the switch 23 is set to the correction data register 22 position (step S28). This allows the correction data latched in the correction data register 22 to be output onto the data bus 5 (step S29). Here, the correction data constitute a one-byte table call instruction for referencing a table in the ROM 3. With the table in the ROM 3 referenced, a correction program starting program held at a predetermined address in the ROM 3 is executed to calculate the address of the correction program in the RAM 4 and to perform other related processing (step S30). Then the correction program in the RAM 4 is executed (step S31). Because return of control from the table call is effected by a jump instruction, the correction content is ended with an instruction for discarding the return address and other data saved in stacks. The discarding instruction is now executed (step S32). Lastly, the jump instruction written in the correction program is carried out to return control to the address that skips the data portion to be corrected in the ROM 3 (step S33). The comparator 8 continues to compare the addresses in preparation for another access to the data portion to be corrected (step S27).

If the ROM 3 includes a plurality of bugs to be corrected, step S31 of FIG. 4 may be followed for each bug by a step of updating the correction address register 21 and the correction data register 22 to reflect the next correction address and the next correction data, respectively. Alternatively, pluralities of comparators 8, correction address registers 21 and correction data registers 22 may be provided to address the multiple bugs. Another modification of the second embodiment is to interpose the control flag switch 7a and switch 7c of FIG. 1 between the comparator 8 and the switch 23 in FIG. 3.

As described, the electronic apparatus according to the invention bypasses detected bugs when supplied with correction data from the outside. If the correction data contain a bug, the data may also be corrected.

As many apparently different embodiments of this invention may be made without departing from the spirit and scope thereof, it is to be understood that the invention is not limited to the specific embodiments thereof except as defined in the appended claims.

What is claimed is:

1. An electronic apparatus integrating, into a single body, fixed storage means for storing read-only data, processing means for performing processing based on the data stored in the fixed storage means and input/output means for outputting and inputting data to and from an outside source, the electronic apparatus comprising:

correction address storage means for storing a correction address of the data stored in the fixed storage means;

correction content storage means for storing a correction content of the data stored in the fixed storage means;

comparing means for comparing an execution address of the processing means with the correction address and for outputting a coincidence signal if the two addresses are found to coincide with each other;

access switching means for switching, when the comparing means outputs the coincidence signal, access by the processing means from the fixed storage means to the correction content storage means; and control means for selectively enabling the storing of data to the correction address storage means and the correction content storage means, selectively enabling the switching access by the access switching means, and causing the correction address and the correction content to be retrieved from an external storage means and placed into the correction address storage means and the correction content storage means, respectively; and wherein the control means prevents the correction address and the correction content from being retrieved from the external storage means and written to the correction address storage means and the correction content storage means when the control means receives a command signal from an external input means.

2. An electronic apparatus according to claim 1, further comprising communicating means, the communicating means communicating with the external input means which allows commands to be input from the external input means to the electronic apparatus for writing and updating the correction address and the correction content in the external storage means;

wherein the control means monitors the status of the communicating means and on the basis of the status selectively disables the storing of data to the correction address storage means and the correction content storage means, as well as selectively disables the switching of the access by the access switching means.

3. An electronic apparatus according to claim 1, further comprising inhibiting means, which is internal to the access switching means and responsive to a command from the external input means, for inhibiting the switching of the access by the processing means.

4. An electronic apparatus according to claim 1, further comprising inhibiting means, which is internal to the access switching means and responsive to a command from the external input means, for preventing the output the coincidence signal from the comparing means from entering the access switching means.

5. An electronic apparatus according to claim 1, wherein the access switching means has control flag latch means for being set depending on whether a correction address is stored in the correction address storage means.

6. An electronic apparatus according to claim 1, wherein the access switching means has control flag latch means for being set depending on whether a correction content is stored in the correction content storage means.

7. An electronic apparatus according to claim 1, wherein, if the data in the fixed storage means include a plurality of items to be corrected, the processing means performs processing based on the data stored in the correction content storage means, the address in the correction address storage means and subsequently updates the content in the correction content storage means to reflect a newly corrected address and content.

8. An electronic apparatus according to claim 1, wherein the correction content is suffixed with a jump instruction for a jump to an address skipping a data portion to be corrected in the fixed storage means.

9. An electronic apparatus for allowing firmware contained therein to be corrected externally at a mass production stage, comprising:

a central processing unit (CPU);

external storage means for storing correction data, including a correction address and correction content data, with which to correct an internal read only memory (ROM) content;

means within the ROM for causing the correction data in the external storage means to be retrieved and stored into a register and a random access memory (RAM);

comparator means for comparing an execution address on an address bus with a correction address in the register and, when there is a match between the execution address and the correction address, generating a coincidence signal;

interrupt means supplied with the coincidence signal for interrupting the CPU to execute the correction content data placed in the RAM, the correction content data taking the place of a data portion to be corrected in the ROM; and wherein if an update command is entered from an external source to update the content of the external storage means, the storing of the correction data into the register and the RAM is inhibited by the CPU.

10. An electronic apparatus according to claim 8, wherein the correction content data is stored in the RAM and the correction address data is stored in the register.

11. An electronic apparatus according to claim 8, wherein the correction content data is suffixed with a jump instruction for a jump to an address skipping a data portion to be corrected in the ROM.

* * * * *